United States Patent
Stockhammer et al.

(10) Patent No.: US 12,075,133 B2
(45) Date of Patent: Aug. 27, 2024

(54) DYNAMIC CONDITIONAL ADVERTISEMENT INSERTION

(71) Applicant: QUALCOMM Incorporated, San Diego, CA (US)

(72) Inventors: Thomas Stockhammer, Bergen (DE); Charles Nung Lo, San Diego, CA (US); Gordon Kent Walker, Poway, CA (US); Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/262,273

(22) Filed: Jan. 30, 2019

(65) Prior Publication Data
US 2019/0238950 A1 Aug. 1, 2019

Related U.S. Application Data

(60) Provisional application No. 62/633,472, filed on Feb. 21, 2018, provisional application No. 62/624,603, filed on Jan. 31, 2018.

(51) Int. Cl.
*H04N 21/81* (2011.01)
*H04N 21/43* (2011.01)
(Continued)

(52) U.S. Cl.
CPC ..... *H04N 21/812* (2013.01); *H04N 21/43072* (2020.08); *H04N 21/433* (2013.01);
(Continued)

(58) Field of Classification Search
CPC .......................... H04N 21/234; H04N 21/235
See application file for complete search history.

(56) References Cited

U.S. PATENT DOCUMENTS

| 8,510,773 | B1* | 8/2013 | Abou-Rizk | ........ G06Q 30/0261 |
| | | | | 725/34 |
| 10,313,721 | B1* | 6/2019 | McLeod | ............ H04N 21/8456 |

(Continued)

FOREIGN PATENT DOCUMENTS

| CN | 101212304 A | 7/2008 |
| CN | 102804686 A | 11/2012 |

(Continued)

OTHER PUBLICATIONS

3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH), 3GPP TS 26.247 V16.0.0, Release 16, Sep. 2018, 137 pages.

(Continued)

*Primary Examiner* — Mushfikh I Alam
(74) *Attorney, Agent, or Firm* — Shumaker & Sieffert, P. A.

(57) ABSTRACT

In one example, a device for retrieving media data includes a memory configured to store media data including advertisement content and main media data, and one or more processors implemented in circuitry and configured to: send advertisement information to an advertisement server device; in response to sending the advertisement information, receive the advertisement content from the advertisement server; retrieve the main media data; and provision the advertisement content to the main media data. The device may further include a coded picture buffer (CPB) and a video decoder that retrieves encoded video data from the CPB for decoding. The one or more processors may provision the advertisement content to the main media content by sending both the advertisement content and the main media content to the CPB.

28 Claims, 9 Drawing Sheets

(51) Int. Cl.
*H04N 21/433* (2011.01)
*H04N 21/434* (2011.01)
*H04N 21/44* (2011.01)
*H04N 21/462* (2011.01)
*H04N 21/6587* (2011.01)
*H04N 21/643* (2011.01)

(52) U.S. Cl.
CPC ..... *H04N 21/434* (2013.01); *H04N 21/44016* (2013.01); *H04N 21/4622* (2013.01); *H04N 21/6587* (2013.01); *H04N 21/643* (2013.01)

(56) References Cited

U.S. PATENT DOCUMENTS

| | | | |
|---|---|---|---|
| 10,681,104 B1* | 6/2020 | Wu | H04N 21/26258 |
| 10,902,474 B2 | 1/2021 | Lo et al. | |
| 2006/0161962 A1* | 7/2006 | Hindle | H04N 21/478 725/115 |
| 2008/0262929 A1* | 10/2008 | Behr | G06Q 30/02 705/14.41 |
| 2010/0257569 A1* | 10/2010 | O'Hanlon | G11B 27/10 725/110 |
| 2011/0107379 A1* | 5/2011 | Lajoie | H04L 65/1016 725/87 |
| 2011/0179446 A1* | 7/2011 | Karaoguz | H04N 21/44016 725/32 |
| 2011/0219098 A1* | 9/2011 | Xu | H04L 67/06 709/219 |
| 2012/0047542 A1* | 2/2012 | Lewis | H04N 21/812 725/97 |
| 2012/0144420 A1* | 6/2012 | Del Sordo | H04N 21/2668 725/35 |
| 2013/0097309 A1* | 4/2013 | Ma | H04L 67/02 709/224 |
| 2014/0040026 A1 | 2/2014 | Swaminathan et al. | |
| 2014/0129729 A1 | 5/2014 | Tandon | |
| 2014/0150019 A1* | 5/2014 | Ma | H04L 65/602 725/34 |
| 2014/0165095 A1* | 6/2014 | Miller | H04N 21/858 725/34 |
| 2014/0236739 A1* | 8/2014 | MacTiernan | G06Q 30/0277 705/14.73 |
| 2014/0282771 A1* | 9/2014 | Tumuluru | H04N 21/2662 725/95 |
| 2014/0365556 A1 | 12/2014 | Rehan et al. | |
| 2015/0033023 A1* | 1/2015 | Xu | H04N 21/4627 713/176 |
| 2015/0128162 A1* | 5/2015 | Ionescu | H04N 21/6125 725/14 |
| 2015/0172161 A1* | 6/2015 | Isaksson | H04L 47/2416 725/95 |
| 2016/0073146 A1* | 3/2016 | Phillips | H04L 65/611 725/34 |
| 2016/0127803 A1* | 5/2016 | Shanson | H04N 21/222 725/32 |
| 2016/0173959 A1* | 6/2016 | Seema | H04N 21/8456 725/116 |
| 2016/0182923 A1* | 6/2016 | Higgs | H04N 21/23424 725/34 |
| 2016/0182973 A1* | 6/2016 | Winograd | H04N 21/262 725/25 |
| 2016/0316233 A1* | 10/2016 | Ghadi | H04N 21/242 |
| 2016/0345074 A1* | 11/2016 | Serbest | H04L 67/306 |
| 2016/0358312 A1 | 12/2016 | Kolb, V et al. | |
| 2017/0142180 A1* | 5/2017 | McGowan | H04L 65/1069 |
| 2017/0332114 A1* | 11/2017 | Turgut | H04N 21/812 |
| 2018/0343479 A1* | 11/2018 | Gibson | H04N 21/251 |
| 2019/0222879 A1* | 7/2019 | Jones | H04N 21/23439 |
| 2023/0283814 A1* | 9/2023 | Turgut | H04N 21/2668 725/32 |

FOREIGN PATENT DOCUMENTS

| | | |
|---|---|---|
| CN | 103561279 A | 2/2014 |
| CN | 103686254 A | 3/2014 |
| CN | 103780929 A | 5/2014 |
| CN | 105376594 A | 3/2016 |
| CN | 105474672 A | 4/2016 |
| CN | 106339908 A | 1/2017 |
| EP | 2464133 A1 | 6/2012 |
| WO | 2014004955 A1 | 1/2014 |
| WO | 2015148513 A1 | 10/2015 |

OTHER PUBLICATIONS

Fielding, et al., "Hypertext Transfer Protocol—HTTP/1.1," Network Working Group, Request for Comments: 2616, Obsoletes: 2068, Category: Standards Track, Jun. 1999, 122 pages.

International Search Report and Written Opinion—PCT/US2019/016019—ISA/EPO—Mar. 18, 2019.

ISO/IEC 23009-1: "Information technology—Dynamic adaptive streaming over HTTP (DASH)—Part 1: Media presentation description and segment formats, Technologies de l'information—Diffusion en flux adaptatif dynamique sur HTTP (DASH)—Part 1: Description of the presentation and delivery of media formats", ISO/IEC 23009-1 International Standard, First Edition, Apr. 1, 2012 (Apr. 1, 2012), pp. I-VI, 1-126, XP002712145, paragraph A.7-A.9 paragraph [OA.4].

ITU-T H.265, "Series H: Audiovisual and Multimedia Systems, Infrastructure of audiovisual services—Coding of moving video, High efficiency video coding," The International Telecommunication Union. Dec. 2016, 664 pp.

Paila T., et al., "FLUTE—File Delivery over Unidirectional Transport," Network Working Group, RFC 6726, Nov. 2012, 46 Pages, Retrieved from the Internet http://tools.ietf.org/html/rfc6726.

ISO/IEC 23009-1: "Information Technology—Dynamic Adaptive Streaming over HTTP (DASH)—Part 1: Media Presentation Description and Segment Formats, Technologies de l'information—Diffusion en Flux Adaptatif Dynamique sur HTTP (DASH)—Partie 1: Description de la Presentation et Formats de Remise des Medias", Draft. Text 3rd Edition, 113. Mpeg Meeting, Oct. 19, 2015-Oct. 23, 2015, Geneva, (Motion Picture Expert Group or ISO/IEC JTC1/SC29/ WG11 ), No. n15686, Dec. 8, 2015, 192 Pages, XP030022374.

* cited by examiner

DYNAMIC CONDITIONAL ADVERTISEMENT INSERTION

This application claims the benefit of U.S. Provisional Application No. 62/624,603, filed Jan. 31, 2018, and of U.S. Provisional Application No. 62/633,472, filed Feb. 21, 2018, the entire contents of each of which are hereby incorporated by reference.

TECHNICAL FIELD

This disclosure relates to storage and transport of encoded media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for a client device to provide information to an advertisement server representing advertisement content that is relevant to the client device. Such relevance may correspond to user demographic data and/or to advertisement quality data, e.g., based on coding and/or rendering capabilities of the client device. For example, the information may indicate qualities and/or features of main content being presented by the client device into which the advertisement content is to be inserted. In this manner, the advertisement server may send advertisement content that matches the quality of the main content being presented, and that satisfies the capabilities of the client device.

In one example, a method of retrieving media data includes sending, by one or more processors implemented in circuitry of a client device, advertisement information to an advertisement server device; in response to sending the advertisement information, receiving, by the one or more processors, advertisement content from the advertisement server; retrieving, by the one or more processors, main media data; and provisioning, by the one or more processors, the advertisement content to the main media data.

In another example, a device for retrieving media data includes a memory configured to store media data including advertisement content and main media data; and one or more processors implemented in circuitry and configured to: send advertisement information to an advertisement server device; in response to sending the advertisement information, receive the advertisement content from the advertisement server; retrieve the main media data; and provision the advertisement content to the main media data.

In another example, a computer-readable storage medium has stored thereon instructions that, when executed, cause a processor of a client device to send advertisement information to an advertisement server device; in response to sending the advertisement information, receive advertisement content from the advertisement server; retrieve main media data; and provision the advertisement content to the main media data.

In another example, a device for retrieving media data includes means for sending advertisement information to an advertisement server device; means for receiving, in response to sending the advertisement information, advertisement content from the advertisement server; means for receiving main media data; and means for provisioning the advertisement content to the main media data.

The details of one or more examples are set forth in the accompanying drawings and the description below. Other features, objects, and advantages will be apparent from the description and drawings, and from the claims.

DETAILED DESCRIPTION

Figure 1:
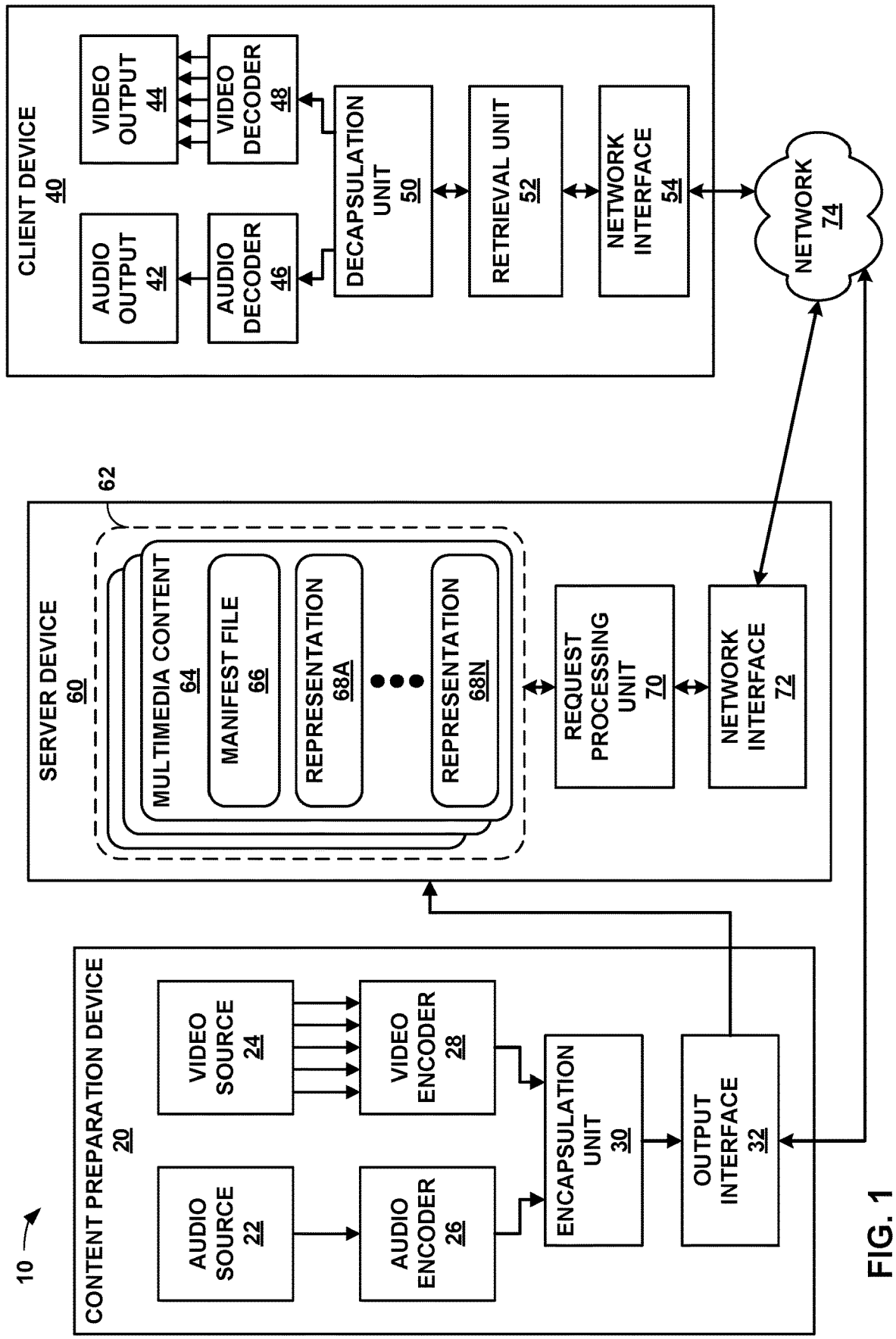
FIG. 1 is a block diagram illustrating an example system that implements techniques for streaming media data over a network.

In general, this disclosure describes techniques for a client device to send information to an advertisement (ad) server representing various types of advertisements and/or advertisement content that are relevant to the client device. For example, the information may indicate that certain advertisements are more relevant to a user of the client device based on one or more demographics of the user, as well as formats for the advertisement content, such as indications of coding and/or rendering capabilities of the client device.

The techniques of this disclosure may be applied to media (e.g., video) files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Common Media Application Format (CMAF) is generally restricted to CMAF Presentations that cover consistent content offerings. However, in many cases, content needs to be offered as a sequence of CMAF Presentations. Examples for such offerings include:
- to enable splicing of content, for example for advertisement (ad) insertion
- to enable splicing of content with different source formats, e.g. switch from 5.1 to stereo, change of frame rate, etc.
- to enable splicing of content of different types
- to provide synchronization in segment numbering, e.g. compensate non-constant segment durations
- to remove or add certain Representations/CMAF Tracks in an Adaptation Set/Switching Set
- to remove or add certain Adaptation Sets/Switching Sets
- to remove or add content offering on certain CDNs
- to enable signaling of shorter segments, if produced by an encoder
- for robustness reasons In several cases, such breaks are relatively "hard," but in other cases, the content is a continuation of the previous one. Continuation can be addressed on two levels:
- semantical continuation (i.e., the content continuous)
- continuation to permit proper playout (i.e., limited changes across such splice points to enable well perceived output)

Practical examples for such issues (from heuristic testing observations) include:
- Playback of the highlights of Bundesliga games. Each match is a separate "Presentation," but over the automated continuation of the program and when played back over HDMI, the HDMI connection is reset and screen goes black for a few seconds
- Pre-Roll ad when joining a live service. After the pre-roll ad is completed, it takes roughly 1-2 seconds until the program is joined and the content is black
- And many more FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream.

Although not expressly shown in FIG. 1, it should be understood that a coded picture buffer (CPB), e.g., a memory, may be positioned between decapsulation unit 50 and video decoder 48 to receive encoded video data (that is, encoded pictures) to be decoded by video decoder 48. In some examples, as explained in greater detail below, decapsulation unit 50 may provide both main media content and advertisement content received from different servers to video decoder 48 via the same CPB. That is retrieval unit 52 may provision the advertisement content to the main media content and cause video decoder 48 to decode both the main media content and the advertisement content. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
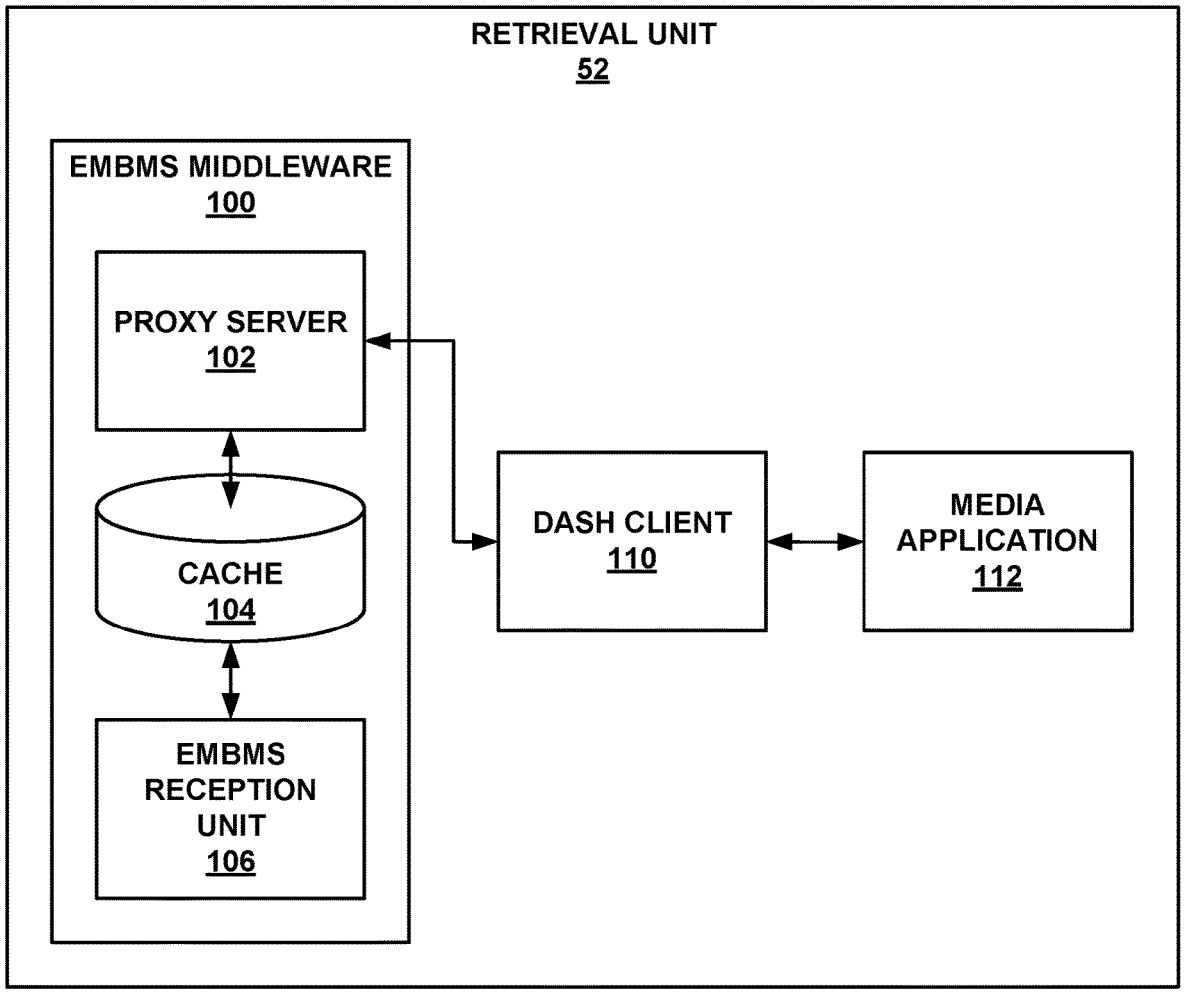
FIG. 2 is a block diagram illustrating an example set of components of a retrieval unit of FIG. 1 in greater detail.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
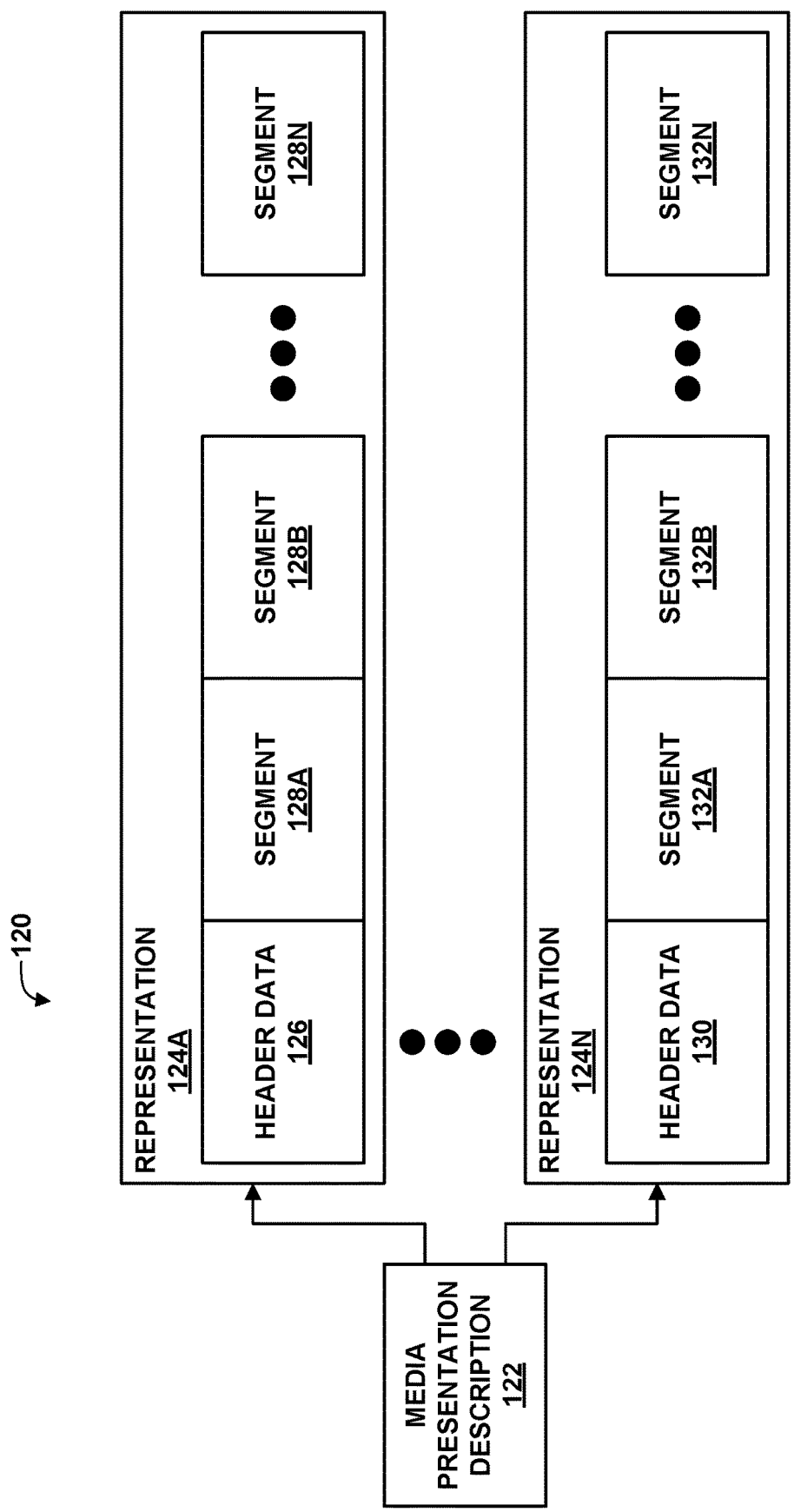
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
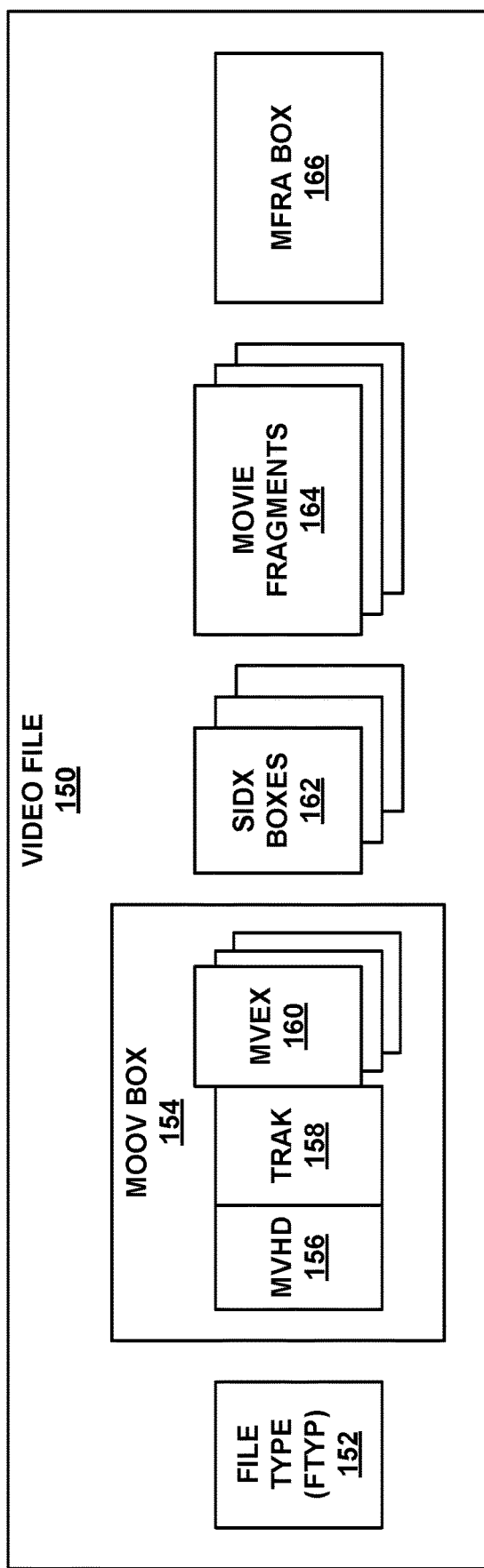
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
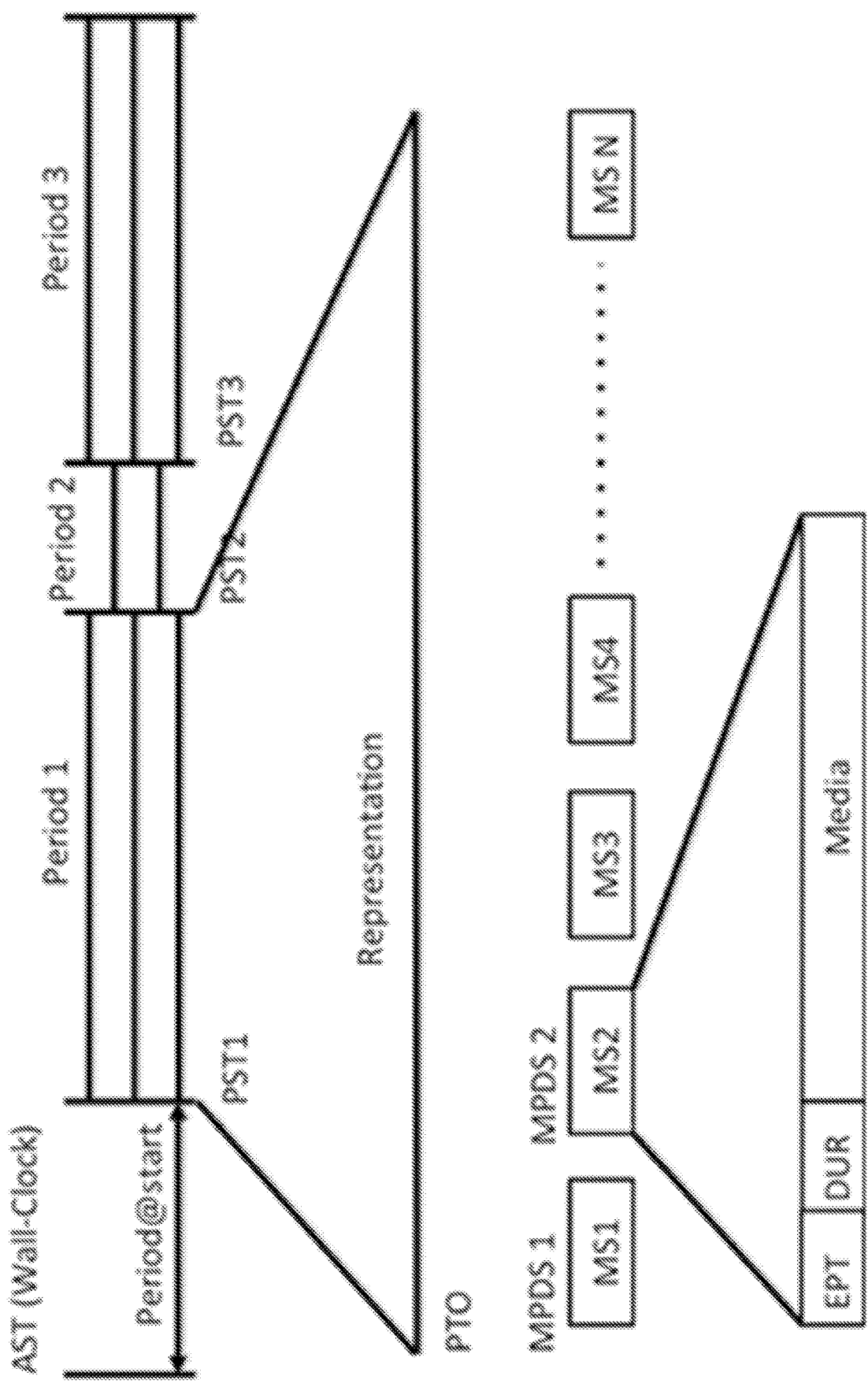
FIG. 5 is a conceptual diagram illustrating examples of various timelines in DASH, and relationships between the timelines.

FIG. 5 is a conceptual diagram illustrating examples of various timelines in DASH, and relationships between the timelines. FIG. 5 depicts three example Periods, each of the Periods containing multiple Representations. For the discussion of the techniques of this disclosure, it is irrelevant whether these Representations are included in the same Adaptation Set or in different Adaptation Sets.

The following information may be available in the MPD (or other manifest file) that relates to timing:

MPD@availabilityStartTime: the start time is the anchor for the MPD in wall-clock time. This value is denoted "AST" in FIG. 5, for "availability start time."

Period@start: the start time of the Period relative to the MPD availability start time. This value is denoted "PST" in FIG. 5, for "period start time."

Representation@presentationTimeOffset: the presentation time offset of the Representation in the Period, i.e., it provides the media time of the Representation that is supposed to be rendered at the start of the Period. Typically, this time is either the earliest presentation time of the first segment or a value slightly larger, in order to ensure synchronization of different media components. If larger, this Representation is presented with short delay with respect to the Period start. This value is denoted "PTO" in FIG. 5, for "presentation time offset."

In addition, with the use of the Representation@duration or Representation. SegmentTimeline, the MPD start time for each segment and the MPD duration for each segment can be derived. For details refer to ISO/IEC 23009-1, and the discussion below.

According to FIG. 5, the AST is a wall-clock time. In this example, AST provides an anchor to all wall-clock time computation in the MPD. The sum of the Period@start of the first Period and the AST provides the Period start time PST1 value in wall-clock time of the first Period.

The media timeline origin for tracks in ISO Base Media Format files is defined to be zero. Each Representation is assigned a presentation time offset, either by the value of the attribute Representation@presentationTimeOffset or, by default, set to 0. The value of this attribute is denoted as "PTO." It is normally the case that for complete files sequenced as Periods, this value is 0. For "partial" files or live streams, @presentationTimeOffset indicates the media composition/presentation time of the samples that synchronize to the start of the Period. @presentationTimeOffset for the live stream will usually not be zero, because encoders are usually started prior to presentation availability, so the media timestamps on the first available Segments will have increased since the encoders started. Encoding timestamps may be set to Coordinated Universal Time (UTC) (as though the encoder was turned on Jan. 1, 1970 at midnight). Representations in Periods of live content typically have the same @presentationTimeOffset as long as the media is continuously encoded, because UTC time and media time increase at the same rate and maintain the same offset.

Certain considerations, as discussed below, are relevant to DASH with reference to the DASH-IF IOP guidelines and Amendment 3 (Amd.3) of MPEG-DASH. In certain circumstances the Media Presentation is offered, such that the next Period is a continuation of the content in the previous Period, possibly in the immediately following Period or in a later Period (e.g., after an advertisement Period had been inserted), in particular that certain media components are continued.

The content provider (e.g., content preparation device 20 of FIG. 1) may express that the media components contained in two Adaptation Sets in two different Periods are associated by assigning equivalent Asset Identifiers to both Periods and by identifying both Adaptation Sets with identical value for the attribute @id. Association expresses a logical continuation of the media component in the next Period and may for example be used by the client to continue playing an associated Adaptation Set in the new Period.

In addition, DASH defines two Adaptation Sets in one MPD as being period-continuous if all of the following holds:

The Adaptation Sets are associated.

The sum of the value of the @presentationTimeOffset and the presentation duration of all Representations in one Adaptation Set are identical to the value of the @presentationTimeOffset of the associated Adaptation Set in the next Period.

If Representations in both Adaptation Sets have the same value for @id, then they shall have functionally equivalent Initialization Segments, i.e., the Initialization Segment may be used to continue the play-out of the Representation. The concatenation of the Initialization Segment of the first Period, if present, and all consecutive Media Segments in the Representation in the first Period and subsequently the concatenation with all consecutive Media Segments in the Representation of the second Period shall represent a conforming Segment sequence as defined in 4.5.4 conforming to the media type as specified in the @mimeType attribute for the Representation in the first Period. Additionally, the @mimeType attribute for the Representation in the next Period shall be the same as one of the first Period.

Media Presentations should signal period-continuous Adaptation Sets by using a supplemental descriptor on Adaptation Set level with @schemeIdUri set to "urn:mpeg:dash:period-continuity:2015" with:

the @value of the descriptor matching the value of an @id of a Period that is contained in the MPD, the value of the AdaptationSet@id being the same in both Periods.

The MPD should signal period-continuous Adaptation Sets if the MPD contains Periods with identical Asset Identifiers.

There exist special cases, for which the media in one Adaptation Set is a continuation of the previous Adaptation Set, but the timestamps are not continuous. Examples are timestamp wrap around, encoder reset, splicing, or other aspects. Two Adaptation Sets in one MPD are period-connected, per DASH, if all conditions from period-continuity from above hold, except that the timestamps across Period boundaries may be non-continuous, but adjusted by the value of the @presentationTimeOffset at the Period boundary. However, for example, the Initialization Segment may be equivalent within the two Adaptation Sets. Media Presentations should signal period-connected Adaptation Sets by using a supplemental descriptor on Adaptation Set level with @schemeIdUri set to "urn:mpeg:dash:period-connectivity:2015."

Period continuity may imply period connectivity.

Content authors in DASH are encouraged to offer content as period-continuous or period-connected signaling if the content follows the rules. The client should exploit such signals for seamless user experience across Period boundaries.

DASH does not address the case for bitstream-switching/single initialization segment. However, if the Initialization Segments are the same across Period boundaries, re-initialization is obviously not necessary. Identical Initialization (Init) Segment may easily be detected by the Initialization Segments having identical URLs.

DASH also does not provide any Cross-Period guarantees or promises for period connectivity and continuity, as it was always considered that content can be played back regardless of this feature, possibly just with some reduced quality.

Period continuity and connectivity was developed for DVB DASH initially due to ad insertion discussions. It has found its application in DASH-IF and DVB, and test content is available.

Single Initialization Segment, Period Continuity and Period connectivity can be used for simplified client playback. In a general DASH mode, at the period boundary, a DASH client would typically select one audio and one video Adaptation Set, possibly a subtitle track as well. At the Period boundary, a complete re-initialization may happen as follows:

1) The DASH client tears down the source buffer of the old Period
2) The DASH client creates a new source buffer with the same mimeType
3) The DASH client appends the Initialization Segment
4) The DASH client appends the first Media Segment The Source buffer reinitialization may cause significant issues. However, if the content is generated with period continuity and connectivity, then tearing down the source buffer is not necessary. Instead, the DASH client may use the same source buffer, as follows:

1) If Period continuity or connectivity is signaled, then the source buffer is maintained.
2) If the Initialization Segment is the same across the two Periods for the Segment to be continued, then the Init Segment is not added to the source buffer.
3) If Period continuity is signaled, then the first media segment of the new Period is appended to the source buffer.
4) If Period connectivity is signaled, then the first media segment of the new Period is appended to the source buffer, at the same the presentation time offset is used to adjust the playout timing of the source buffer to ensure continuous playback.

In DASH, Adaptation Sets are continuous, i.e., the issue is dealt per media component. This also means that whatever permits seamless switching within an Adaptation Sets across Representations is also identical on Period boundaries. Hence, the constraints across Periods are directly inherited.

Generally, CMAF would benefit from a similar concept, following the discussion in CTA WAVE (Consumer Technology Association Web Application Video Ecosystem) as an example, but also for the mapping of CMAF content to DASH. Two aspects may be addressed:

1) Track and Switching Set continuity/connectivity across CMAF Presentations.
2) Profiles for sequences of CMAF presentations that fulfil certain requirements at the boundary.

The latter aspect may be deferred to later, or may be handled by applications of CMAF. The focus in CMAF should be on the first aspect above.

With respect to Track and Switching Set continuity/connectivity across CMAF Presentations, three example options include:

1) Every media profile defines the requirements for continuity/connectivity for itself.
2) By well-defined media profiles and Switching Set constraints, the concept of continuity/connectivity is directly inherited from the definitions.
3) By default, inheritance is done, but media profiles may restrict Switching Set connectivity further.

Using inheritance but allowing media profiles to restrict Switching Set connectivity may be suitable, as it results in minimum changes for the existing CMAF specification, but leaves room and opportunities for further consideration for each media profile.

This disclosure recognizes one potential inherent problem in the CMAF specification: All CMAF tracks in a CMAF presentation containing a video switching set shall be start aligned with CMAF presentation time zero equal to the earliest video media sample presentation start time in the earliest CMAF fragment, see 6.6.8 CMAF presentation and Timing Model. This means that a follow up CMAF presentation cannot have presentation time zero, as this would result in a discontinuity in presentation times.

This is an over-restriction in CMAF. DASH permits Periods that start with presentation times other than 0 (and can be compensated with the presentationTimeOffset), but CMAF prohibits non-zero start time. Hence, the baseline WAVE programs cannot be constructed. The techniques of this disclosure may be used to fix this issue. In particular, the following clause may be added to CMAF as an update:

7.3.7 Presentation of Switching Sets across Presentation Boundaries

In many cases, content needs to be offered as a sequence of CMAF Presentations. Examples for such offerings are:
 to enable splicing of content, for example for ad insertion,
 to enable splicing of content with different source formats, e.g., switch from 5.1 to stereo, change of frame rate, etc.
 to remove or add certain Representations/CMAF Tracks in an Adaptation Set/Switching Set,
 to remove or add certain Adaptation Sets/Switching Sets,
 for robustness reasons While in general, continuous presentation of a specific media type across CMAF Presentation boundaries may be difficult, if the content is properly prepared, the playback of the media type in a Switching Set in one CMAF Presentation may be generated such that it can be seamlessly played back as a continuation of a Switching Set in another/preceding CMAF Presentation across such boundaries.

The content provider may express that the media components contained in Switching Sets in a CMAF Presentation are connected to a Switching Set in a preceding/another CMAF Presentation. CMAF Switching Set Connectivity may be signaled, if and only if the Switching Set in a following CMAF Presentation has the following properties:
 All CMAF Tracks in the Switching Set in the following CMAF Presentation shall have a CMAF Header that may also be present in the Switching Set of the preceding CMAF Presentation.
 All encoding parameters of the CMAF Tracks in the Switching Set in the following CMAF Presentation shall be such that they fulfill the Switching Set constraints in the Switching Set of the preceding CMAF Presentation.
 It fulfills the media profile constraints for Connected Switching Sets, if the media profile defines further restrictions.

No explicit signaling is defined in CMAF for this purpose, but is left to manifests in order to instruct players to support such playout.

The content provider may express that the media components contained in Switching Sets in a preceding/another CMAF Presentation are continuous to a Switching Set in a preceding CMAF Presentation. Switching Set Continuity may be signaled, if the Switching Set in a following CMAF Presentation has the following properties:

The Switching Sets shall be connected.

The sum of the first presentation time of a CMAF track and CMAF track duration of all tracks in a Switching Set in a preceding CMAF are identical to the first presentation time of a CMAF track in the following CMAF Presentation.

In specific cases, the two Switching Sets may also share a common CMAF header.

In a hypothetical playback model across CMAF Presentation boundaries, in a hypothetical playback model a player would typically select one audio and one video CMAF Switching Set, and possibly one for subtitles as well as well. At the Presentation boundary a complete re-initialization would happen as follows:

1) The player tears down the source buffer for each media type of the preceding CMAF Presentation
2) The player creates a new source buffer for each Switching Set of new the CMAF Presentation
3) For each media type,
   a. the player appends the CMAF Header
   b. The player appends the first CMAF Fragment and possibly sets the timing to the presentation time of the signaled first presentation time The Source buffer reinitialization may cause significant issues in continuous playback perception as media pipelines may be re-initialized.

Single Initialization Segment, CMAF Switching Set Continuity and CMAF Switching Set Connectivity may be used for simplified client playback. In a hypothetical playback model across CMAF Presentation boundaries, an application client may make use of such signaling as follows:

1) If Switching Set Continuity or Connectivity is signaled, then the source buffer is maintained.
2) If the CMAF Header is the same across the two CMAF Presentations for the two tracks to be played out, then the CMAF Header is not added to the source buffer.
3) If Switching Set Continuity is signaled, then the first CMAF Fragment of the new Presentation is appended to the source buffer.
4) If Switching Set Connectivity is signaled, then the first CMAF Fragment of the new Presentation is appended to the source buffer, and the presentation time offset is used to adjust the playout timing of the source buffer to ensure continuous playback.

Several activities may address the issue of seamless playback of content when an ad is inserted at client device 40, server device 60, or other such devices. Examples include:

CTA WAVE addresses program and device constraints for ad insertion

MPEG CMAF addresses core enablers

DASH-IF Ad Insertion Task Force for DASH-IF IOP

DVB Targeted Ad Insertion develops commercial requirements

Figure 6:
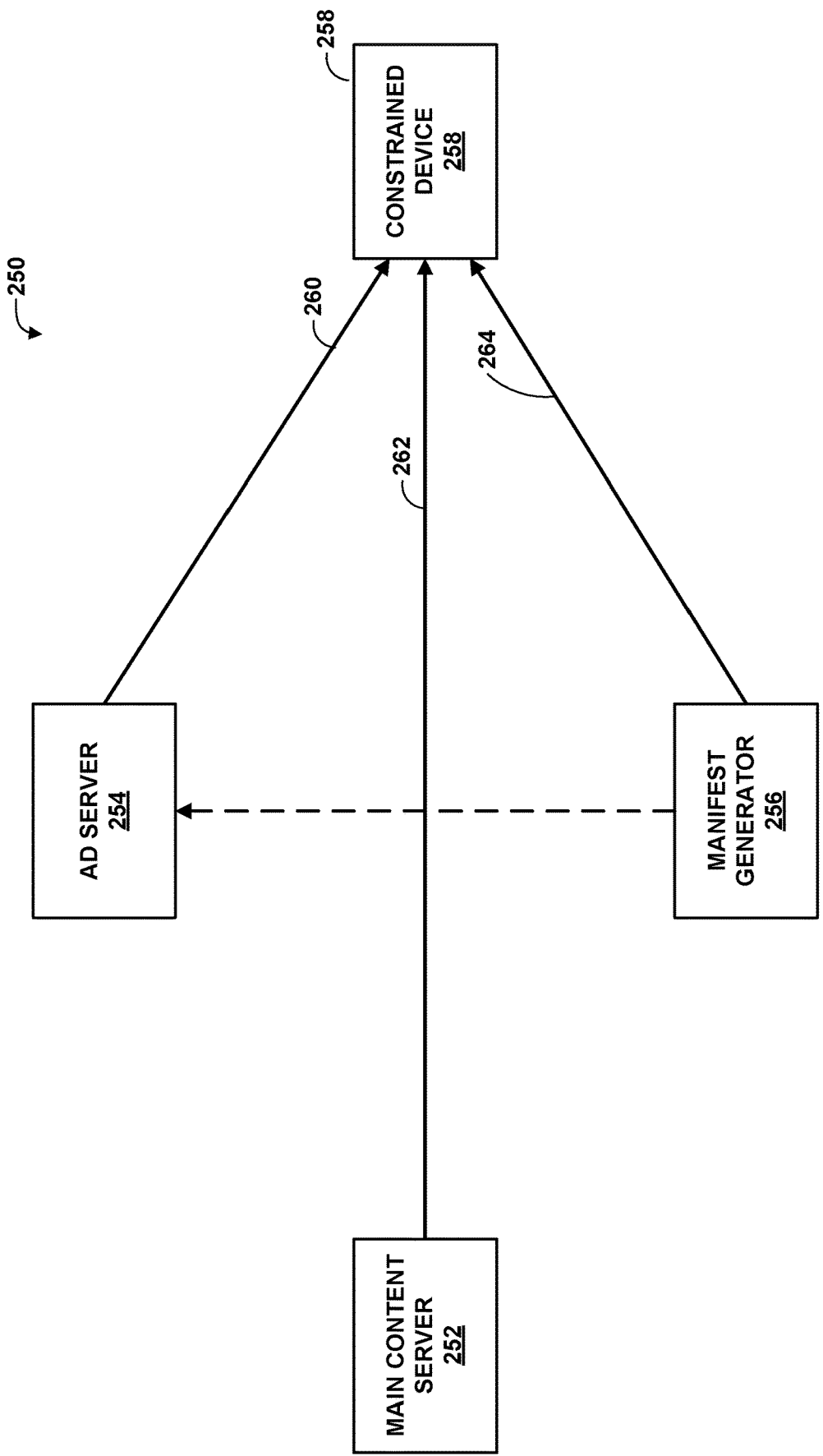
FIG. 6 is a conceptual diagram illustrating an example system in which advertisements are to be inserted into main content.

FIG. 6 is a conceptual diagram illustrating an example system 250 in which advertisements are to be inserted into main content. System 250 includes advertisement ("ad") server 254, main content server 252, and manifest generator 256. In some cases, the functionality attributed to ad server 254, main content server 252, and manifest generator 256 may be incorporated into a single device. However, in the example of FIG. 6, separate server devices as shown perform this functionality. In particular, ad server 254 provides ad insertion segments 260 to constrained device 258, main content server 252 provides segments of main content 262 to constrained device 258, and manifest generator 256 provides manifest file 264 (e.g., an MPD) to constrained device 258.

In many cases, ad content is provided on a separate library and independent of main content. While ads may in general be considered "annoying" to users, there is a significant benefit if the quality of the add matches some or all of the following:

1. The quality of the ad being matched to the capabilities of the client device (e.g., decoding and/or rendering capabilities).
2. Feature(s) of the ad, for example, whether interactivity is supported or not.
3. The quality of the ad being matched to the currently playing main content. E.g., avoiding any HDMI resets, source buffer reinitialization, unnecessary black frames due to content splicing, encryption and protected content mismatches, different audio codec configurations, etc. This can be further refined by taking a combination of the played content and the device capabilities, for example for certain capabilities the ad performance can be improved.
4. The encoding requirements (timing, splicing) of the ad at the ad splice point.
5. The personalization of the ad to the user, for example based on user ids, geolocation and so on.
6. The duration of the ad slot.
7. Other issues that permit targeting the ad.

Conventional techniques have especially not emphasized the third issue of matching the quality of ads to that of currently playing main content largely until today, because many workflows are quite vertical and content providers also condition their ads. However, with more and more content formats, device capabilities, and different formats, there is a benefit in combining the above for a consistent way and providing the ad server as much information as possible, in order to provide a "good" spliced ad.

The ad may also include data providing instructions on conditions for the ad, in order for the playback to optimize the user experience by using proper playback instructions.

Yet another aspect is the issue that the receiver may add two SourceBuffers (media decoding elements), one for ad playback and one for the main content.

Figure 7:
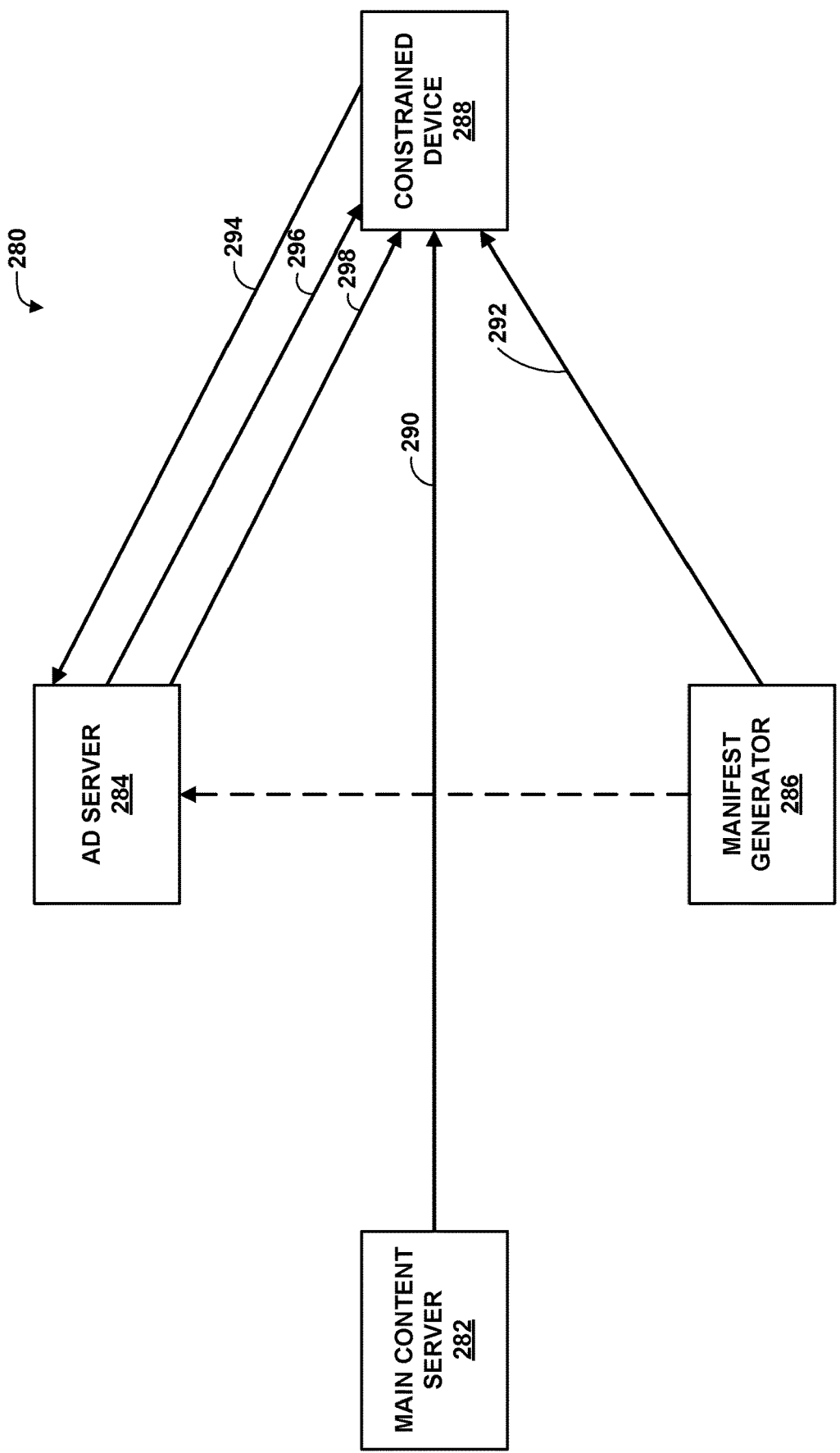
FIG. 7 is a conceptual diagram illustrating an example system in which advertisements are to be inserted into main content.

FIG. 7 is a conceptual diagram illustrating an example system 280 in which advertisements are to be inserted into main content. System 280 includes advertisement ("ad") server 284, main content server 282, and manifest generator 286. In some cases, the functionality attributed to ad server 284, main content server 282, and manifest generator 286 may be incorporated into a single device. However, in the example of FIG. 7, separate server devices as shown perform this functionality. In particular, ad server 284 provides ad insertion segments 298 to constrained device 288, main content server 282 provides segments of main content 290 to constrained device 288, and manifest generator 286 provides manifest file 292 (e.g., an MPD) to constrained device 288.

According to the techniques of this disclosure, constrained device 288 (which may represent a client device, such as client device 40 of FIG. 1) sends conditioned requested information 294 to ad server 284. Ad server 284 uses this information to provide ad content to constrained device 288. In particular, ad server 284 can play out the ad content in a suitable and adjusted manner. This includes that constrained device 288 may provision the ad content to the main content to be displayable within one source buffer, such as a coded picture buffer (CPB) of a video decoder. In particular, the ad content that ad server 284 provides includes a targeted sub-manifest file 296 and ad insertion segments 298. One important issue is that ad server 284 may have sufficient information regarding capabilities (e.g., decoding and/or rendering capabilities) of constrained device 288, as well as on the content currently being played by constrained device 288. Based on this information, ad server 284 may properly prepare and provide the content such that playback is seamless.

As one example, constrained device 288 may provide any of the following information, alone or in any combination, to ad server 284:
1) Capabilities of constrained device 288, for example, how ad insertion can be handled. Some example options include:
   a. Single source buffer with static initialization.
   b. HDMI properties
   c. Multiple source buffers
   d. Regular media source extensions (MSE) operation
2) The ad insertion time slot. This allows ad server 284 to accurately select the ad and the ad boundaries.
3) The properties of the played content, for example, CMAF Header of the played content of each media component. This allows ad server 284 to select proper content that matches the playback.
4) The last played timing of the main content for each media component. This allows ad server 284 to splice content properly, for example, to avoid overlaps or to exactly splice the ad with the main content.

In accordance with the techniques of this disclosure, constrained device 288 (e.g., client device 40 of FIG. 1) and ad server 284 (e.g., server device 60 of FIG. 1) may exchange any or all of the following information:
Constrained device 288 may signal data representing relevant information, including any or all of content properties, playback status, device capabilities, user information, typical other ad insertion information, and/or ad insertion time slot. Ad server 284 may use this information to customize the ad content for seamless and proper playback.
Ad server 284 (or manifest generator 286) may signal part of the relevant information (per the above) in a manifest file (such as an MPD of DASH) of the main content.
For example, ad server 284 may signal an ad insertion time slot and static content properties.
Constrained device 288 may signal the relevant information above in query parameters to ad server 284.
Constrained device 288 may signal the relevant information above in HTTP headers to ad server 284.
The relevant information discussed above may include any or all of:
Content properties, playback status, device capabilities, user information, typical other ad insertion information, and/or ad insertion time slot.
Content properties may include, but are not limited to:
For each video media type
  Codec, profile and level
  Frame rate
  Encryption scheme
  Spatial resolution
  Transfer characteristics
  Color scheme
  Etc.
For each audio media type
  Codec, profile and level
  Sampling frequency
  Output channel configuration
  Etc.

Content properties may be expressed as any or all of:
Movie header, CMAF header, mime types and sub-mime parameters, DASH MPD signaling, etc.
Playback status may be expressed as:
Last time played in media decode time, presentation time
Device capabilities expressed as
  MSE version
  CTA WAVE capabilities
  Number of source buffers
  Etc.
Ad content expressed as
  Period in MPD
  Another MPD
  High Level Signaling (HLS) manifest
  ISO BMFF file Constrained device 288 may signal the advertisement information to ad server 284 in various ways. For example, constrained device 288 may add a query string to a sub-manifest request with the properties of one or more of the content property, the device capabilities, and/or the timing. Additionally or alternatively, constrained device 288 may add a dedicated HTTP extension header to the request for the manifest or sub-manifest. Additionally or alternatively, constrained device 288 may add a URL in the request for the manifest or sub-manifest corresponding to a network location from which ad server 284 can obtain advertisement information for constrained device 288.

Figure 8:
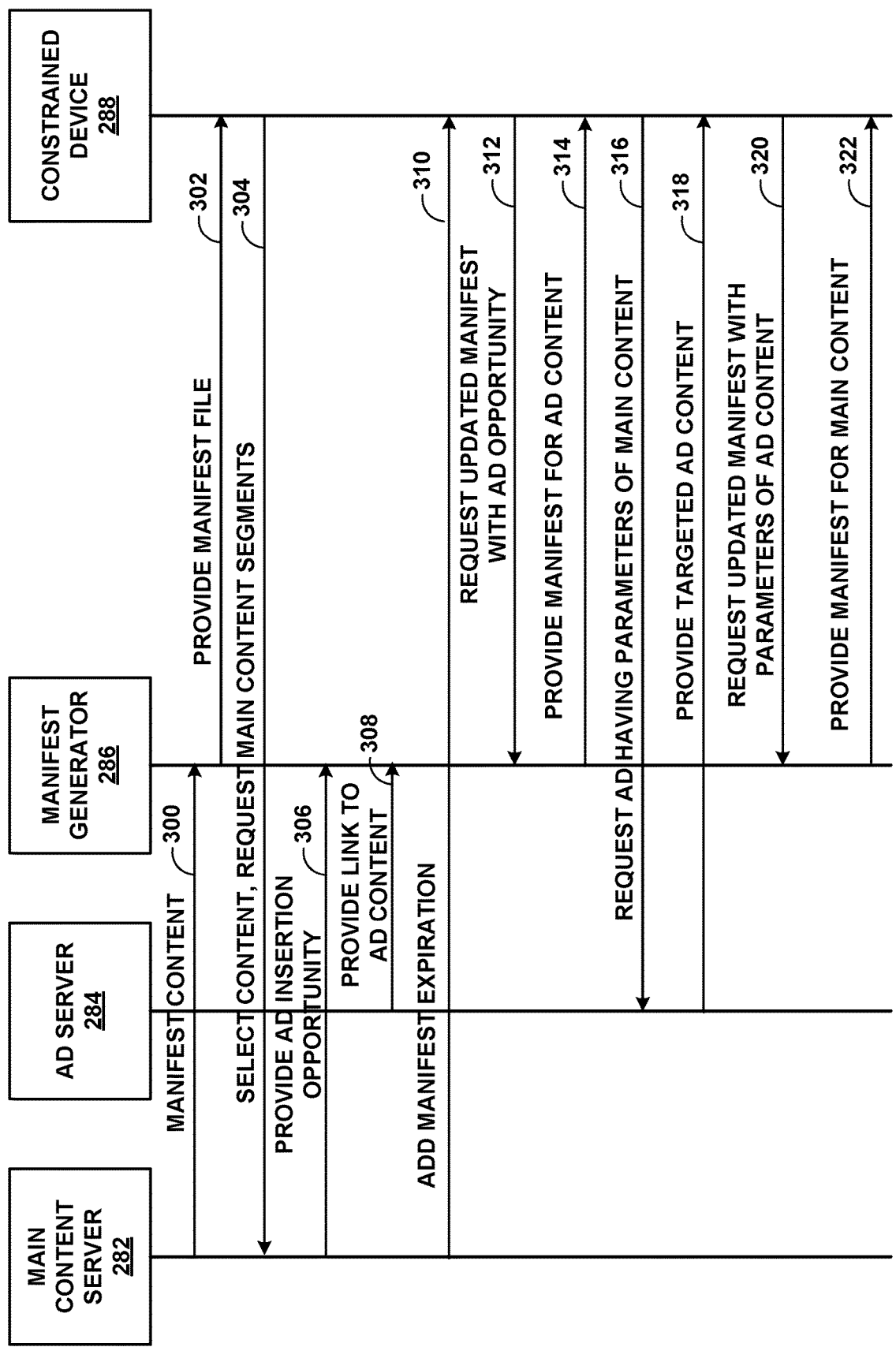
FIG. 8 is a flow diagram illustrating an example method by which techniques of this disclosure may be performed.

FIG. 8 is a flow diagram illustrating an example method by which techniques of this disclosure may be performed. The method of FIG. 8 includes actions performed by, e.g., main content server 282, ad server 284, manifest generator 286, and constrained device 288 of FIG. 7, in this example. It should be understood that in other examples, other devices (such as server device 60, content preparation device 20, and client device 40 (FIG. 1), along with a separate ad server device not shown in FIG. 1) may be configured to perform this or a similar method according to the techniques of this disclosure.

Initially, main content server 282 sends manifest content to manifest generator 286 (300). For example, main content server 282 may send data representing sets of audio and video data for main content, e.g., formats, codecs, languages, bitrates, and the like. Manifest generator 286 may then generate a manifest file (such as a media presentation description (MPD)) and provide the manifest file (302) to constrained device 288.

Constrained device 288 may then analyze the manifest file and select appropriate content, then request main content segments (304) of the selected content. For example, constrained device 288 may select the content based on device capabilities (e.g., decoding and rendering capabilities), available network bandwidth, and user preferences (e.g., language preferences). Additional parameters may include, for example, codecs supported by decoders of constrained device 288, spatial and temporal resolution of a display, high dynamic range (HDR) capabilities, audio codec and rendering capabilities, and the like. To request the segments, constrained device 288 may submit HTTP Get or partial Get requests to URLs provided in the manifest file for segments corresponding to the selected content.

At some point in time, main content server 282 provides an ad insertion opportunity (306) to manifest generator 286. Ad server 284 may also provide a link to the ad content (308) to manifest generator 286. Main content server 282 may also add a signal to the content in order to expire the manifest file (310) that constrained device 288 previously received, to prompt a streaming client of constrained device 288 to request an updated manifest file including the ad opportunity (312). In response to the request, manifest generator 286 may send an updated manifest for ad content (314) to constrained device 288. The updated manifest may include a sub-manifest that targets the media player of constrained device 288 to ad server 284. Constrained device 288 may generate the request for the updated manifest file to include additional parameters, such that ad server 284 is aware of the currently playing content, personalization information, and the like, as well as the capabilities of the media player of constrained device 288.

Constrained device 288 may use various techniques to indicate parameters of currently playing main content to manifest generator 286 and/or ad server 284. For example, constrained device 288 may send a current movie header/initialization segment/CMAF header of each track currently being played to manifest generator 286 and/or ad server 284. Such header data generally provides a good overview of codecs, formats, and the like. In another example, constrained device 288 may send mime type data with codecs, sub-parameters, or the like. In some examples, constrained device 288 may additionally send the presentation time of the last presented sample in order to provide a continuous presentation.

Using the updated manifest, constrained device 288 may request ad content segments having parameters of the previously retrieved main content (316) from ad server 284, e.g., the same codec, frame rate, spatial resolution, language, and the like. That is, constrained device 288 may send advertisement information to ad server 284. Again such requests for ad content segments may be HTTP Get or partial Get requests. These requests may specify the advertisement information. In response to these requests, ad server 284 may provide targeted at content (318) to constrained device 288. Constrained device 288 may also requested another updated manifest file with parameters of the ad content (320) from manifest generator 286, which may provide the updated manifest file for the main content (322) to constrained device 288. Constrained device 288 may then resume requesting main content segments as discussed above with respect to step 304. Constrained device 288 may also play out the received media data, i.e., the main media content and the ad content. In this manner, constrained device 288 may provision the ad content to the main media content (e.g., decode the ad content along with the main media content).

One issue that is generally observed is the problem of splicing content for which two media types, typically audio and video, have different "end times" before the splice point or different starting times. In this case, the transition for each media type may be done carefully and individually. This may include that, for example, one of the media types has a gap, or content may overlap. Overlap may be difficult in a single source buffer as the splice point is ambiguous. Gaps may cause issues because the playback gets stalled or interrupted.

In this manner, the method of FIG. 8 represents an example of a method of receiving media data including sending, by one or more processors implemented in circuitry of a client device, advertisement information to an advertisement server device, in response to sending the advertisement information, receiving, by the one or more processors, advertisement content from the advertisement server, receiving, by the one or more processors, main media data, and provisioning, by the one or more processors, the advertisement content to the main media data.

Figure 9:
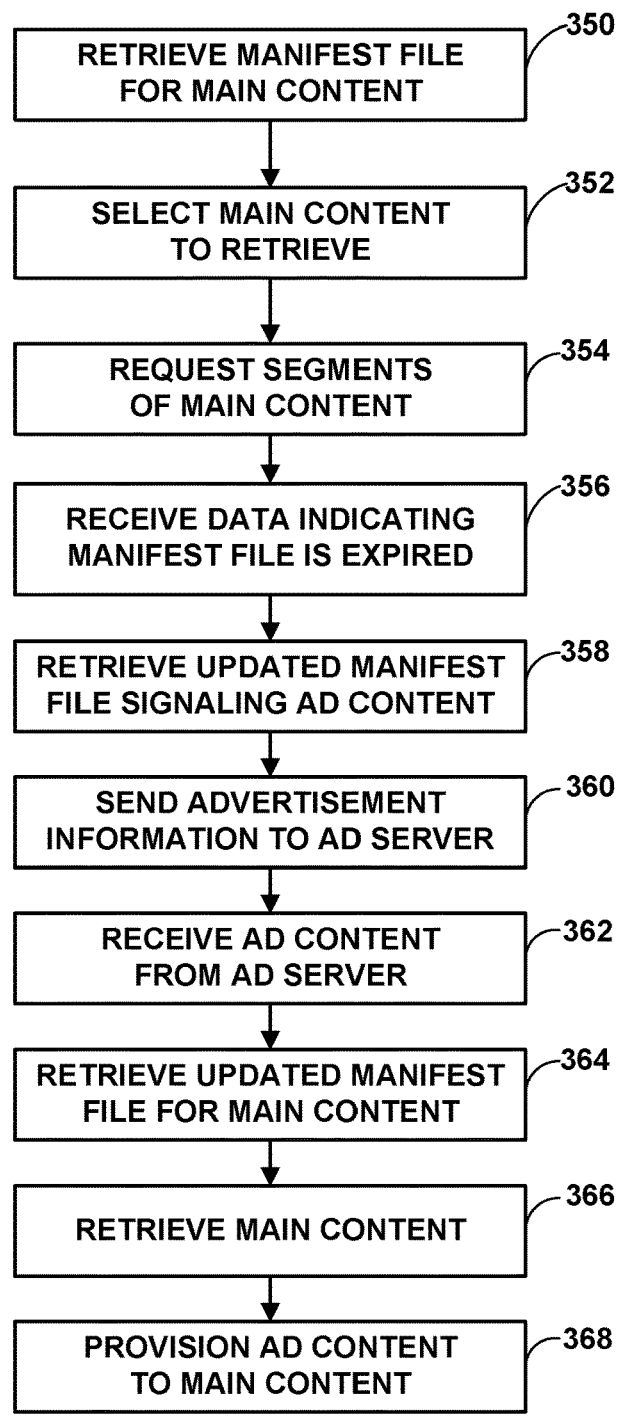
FIG. 9 is a flowchart illustrating an example method of retrieving media data in accordance with the techniques of this disclosure.

FIG. 9 is a flowchart illustrating an example method of retrieving media data in accordance with the techniques of this disclosure. The method of FIG. 9 is explained with respect to client device 40 of FIG. 1 for purposes of example. However, it should be understood that other devices may be configured to perform this or a similar method, such as constrained device 288 of FIG. 7.

Initially, retrieval unit 52 of client device 40 retrieves a manifest file for main content (350). For example, a user may request to view a particular movie, and retrieval unit 52 may determine a manifest file associated with main content corresponding to the user-selected movie. Retrieval unit 52 may then retrieve the manifest file, e.g., by issuing an HTTP Get request directed to a URL associated with the manifest file. As discussed above, the manifest file may be a DASH MPD.

Retrieval unit 52 may then determine main content to retrieve (352). For example, retrieval unit 52 may determine coding and rendering capabilities of video decoder 48, audio decoder 46, video output 44, and audio output 42, as well as user preferences (such as language preferences), then select appropriate adaptation sets according to these capabilities and preferences. Retrieval unit 52 may then select representations within the adaptation sets according to available network bandwidth. Retrieval unit 52 may then request segments of the main content (354), e.g., by issuing HTTP Get or partial Get requests to retrieve segments of the selected representations.

At some point, content preparation device 20 or server device 60 may send data indicating that the manifest file is expired. Content preparation device 20 may issue this data in response to determining that an advertisement is to be inserted into the main content. Likewise, client device 40 may receive the data indicating that the manifest file is expired (356). This data may be included in-band with retrieved main content or as side information. In response, retrieval unit 52 may retrieve an updated manifest file signaling the availability of ad content (358).

In response, retrieval unit 52 may send advertisement information to an ad server device (360). The advertisement information may be representative of the selected main content (e.g., codec, frame rate, resolution, etc.), information indicating a profile for a user of client device 40 to ensure the ad content is relevant and interesting to the user, or the like. In response, retrieval unit 52 may receive ad content from the ad server (362). After receiving the ad content, retrieval unit 52 may once again retrieve an updated manifest file for the main content (364), and retrieve the main content (366) using the updated manifest file. Client device 60 may then provision the ad content to the main content (368). That is, retrieval unit 52 may provide the main content and the ad content together to be decoded, processed, and presented by client device 60.

In this manner, the method of FIG. 9 represents an example of a method of receiving media data including sending, by one or more processors implemented in circuitry of a client device, advertisement information to an advertisement server device, in response to sending the advertisement information, receiving, by the one or more processors, advertisement content from the advertisement server, receiving, by the one or more processors, main media data, and provisioning, by the one or more processors, the advertisement content to the main media data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
retrieving, by a processing system comprising one or more processors implemented in circuitry of a client device, main media data from a main media server device according to an initial manifest file for the main media data in real time as part of a live stream, the main media data comprising media data of a representation that is assigned a non-zero value for a presentation time offset in the initial manifest file, the main media server device being separate from an advertisement server device, wherein retrieving the main media data comprises receiving the main media data via a first stream from the main media server device, the first stream comprising the live stream;
receiving, by the processing system, data indicating that the initial manifest file has expired for the live stream;
sending, by the processing system, a request for an updated manifest file for the main media data;
receiving, by the processing system, the updated manifest file for the main media data, the updated manifest file including data for continuing to retrieve the main media data in real time as part of the live stream, and the updated manifest file further including data for retrieving one or more remote periods including advertisement content;
determining, by the processing system, an advertisement insertion time slot of the main media data from the updated manifest file for the main media data, the advertisement insertion time slot representing a defined gap in the main media data at a presentation time;
sending, by the processing system, advertisement information to the advertisement server device, the advertisement information representing characteristics of the advertisement content to be received to fill the defined gap in the main media data, the characteristics including data representing the advertisement insertion time slot and matching qualities of the main media data, wherein sending the advertisement information to the advertisement server device comprises constructing one or more network packets including an Internet protocol (IP) address of the advertisement server device, the one or more network packets including the advertisement information, and sending the one or more network packets to the advertisement server device;
in response to sending the advertisement information, receiving, by the processing system, the advertisement content from the advertisement server device conforming to the characteristics, the advertisement content being formatted to fill the defined gap at the presentation time and to prevent overlap between the advertisement content and the main media data, wherein receiving the advertisement content comprises receiving the advertisement content via a second stream from the advertisement server device, the second stream being separate from the first stream, such that the advertisement content as received by the processing system is separate from the main media data;
provisioning, by the processing system, the advertisement content to the main media data, wherein provisioning the advertisement content to the main media data comprises inserting, by the processing system, the advertisement content into the main media data at the advertisement insertion time slot of the main media data to fill the defined gap at the presentation time and to prevent overlap between the advertisement content and the main media data; and sending, by the processing system, the main media data including the advertisement content at the advertisement insertion time slot to a video decoder of the client device.

2. The method of claim 1, wherein provisioning comprises provisioning the advertisement to the main media data to be displayable within one source buffer of the client device.

3. The method of claim 1, wherein sending the advertisement information comprises sending data representing one or more of quality of media data that can be decoded or rendered by the client device, one or more features for media data that are supported by the client device, requirements of the advertisement content at an advertisement splice point, personalization information to a user of the client device, or duration of the advertisement insertion time slot.

4. The method of claim 1, wherein the matching qualities comprise one or more of avoidance of HDMI resets, source buffer reinitialization, unnecessary black frames, encryption and protected content mismatches information, audio codec configurations, or capabilities of the client device.

5. The method of claim 1, wherein sending the advertisement information comprises sending data representing one or more of capabilities of the client device, the advertisement insertion time slot, properties of the main media data, or a last played timing of the main media data for a media component.

6. The method of claim 5, wherein the data representing the one or more capabilities of the client device comprises data representing how the client device can handle advertisement insertion.

7. The method of claim 5, wherein the data representing the one or more capabilities of the client device comprises data representing whether the client device supports one or more of a single source buffer with static initialization, HDMI properties, multiple source buffers, or regular media source extensions (MSE) operation.

8. The method of claim 5, wherein the data representing the advertisement insertion time slot comprises data representative of an appropriate advertisement and advertisement boundaries for the advertisement insertion time slot.

9. The method of claim 5, wherein the data representing the properties of the main media data comprise a Common Media Application Format (CMAF) Header of the main media content of one or more media components.

10. The method of claim 5, wherein the data representing the last played timing comprises data representing how the advertisement content can be spliced with the main media data.

11. The method of claim 1, wherein sending the advertisement information comprises sending one or more of content properties for the main media data, playback status for the main media data, capabilities of the client device, user information for a user of the client device, or advertisement insertion time slot information.

12. The method of claim 11, further comprising determining the advertisement information to be sent to the advertisement server device from data of the updated manifest file.

13. The method of claim 12, wherein determining the advertisement information from the data of the updated manifest file comprises determining one or more of the advertisement insertion time slot or static content properties from the data of the updated manifest file.

14. The method of claim 11, wherein the content properties include, for video media of the main media content, one or more of a video codec, a profile indication, a level indication, a frame rate, an encryption scheme, transfer characteristics, or color scheme.

15. The method of claim 11, wherein the content properties include, for audio media of the main media content, one or more of an audio codec, a profile indication, a level indication, a sampling frequency, or an output channel configuration.

16. The method of claim 11, wherein sending the advertisement information comprises sending the content properties expressed as one or more of a movie header, a CMAF header, mime types, sub-MIME types, or DASH MPD signaling.

17. The method of claim 11, wherein sending the advertisement information comprises sending the capabilities of the client device, expressed as one or more of a media source extensions (MSE) version, one or more Consumer Technology Association Web Application Video Ecosystem (CTA WAVE) capabilities, or a number of source buffers supported by the client device.

18. The method of claim 1, wherein sending the advertisement information comprises sending at least a portion of the advertisement information in one or more query parameters.

19. The method of claim 1, wherein sending the advertisement information comprises sending at least a portion of the advertisement information in one or more HTTP headers.

20. A device for retrieving media data, the device comprising:

a video decoder implemented in circuitry;

a memory configured to store media data including advertisement content and main media data; and a processing system comprising one or more processors implemented in circuitry, the processing system being configured to:

retrieve the main media data from a main media server device according to an initial manifest file for the main media data in real time as part of a live stream, the main media data comprising media data of a representation that is assigned a non-zero value for a presentation time offset in the initial manifest file, the main media server device being separate from an advertisement server device, wherein to retrieve the main media data, the processing system is configured to receive the main media data via a first stream from the main media server device, the first stream comprising the live stream;

receive data indicating that the initial manifest file has expired for the live stream;

send a request for an updated manifest file for the main media data;

receive the updated manifest file for the main media data, the updated manifest file including data for continuing to retrieve the main media data in real time as part of the live stream, and the updated manifest file further including data for retrieving one or more remote periods including advertisement content;

determine an advertisement insertion time slot of the main media data from the updated manifest file for the main media data, the advertisement insertion time slot representing a defined gap in the main media data at a presentation time;

send advertisement information to the advertisement server device, the advertisement information representing characteristics of the advertisement content to be received to fill the defined gap in the main media data, the characteristics including data representing the advertisement insertion time slot and matching qualities of the main media data, wherein to send the advertisement information to the advertisement server device, the processing system is configured to construct one or more network packets including an Internet protocol (IP) address of the advertisement server device, the one or more packets including the advertisement information, and to send the one or more network packets to the advertisement server device;

in response to sending the advertisement information, receive the advertisement content from the advertisement server device conforming to the characteristics, the advertisement content being formatted to fill the defined gap at the presentation time and to prevent overlap between the advertisement content and the main media data, wherein to receive the advertisement content, the processing system is configured to receive the advertisement content via a second stream from the advertisement server device, the second stream being separate from the first stream, such that the advertisement content as received by the processing system is separate from the main media data;

provision the advertisement content to the main media data, wherein to provision the advertisement content to the main media data, the processing system is configured to insert the advertisement content into the main media data at the advertisement insertion time slot of the main media data to fill the defined gap at the presentation time and to prevent overlap between the advertisement content and the main media data; and send the main media data including the advertisement content at the advertisement insertion time slot to the video decoder.

21. The device of claim 20, further comprising a coded picture buffer, wherein the main media data and the advertisement content comprise encoded video data, wherein to send the encoded video data to the video decoder, the processing system is configured to store the encoded video data to the coded picture buffer, and wherein the video decoder is configured to retrieve the encoded video data to be decoded from the coded picture buffer.

22. The device of claim 20, wherein the advertisement information comprises one or more of quality of media data that can be decoded or rendered by the device, one or more features for media data that are supported by the device, matching qualities of the main media data, requirements of the advertisement content at an advertisement splice point, personalization information to a user of the device, or duration of the advertisement insertion time slot.

23. The device of claim 20, wherein the advertisement information comprises one or more of capabilities of the device, the advertisement insertion time slot, properties of the main media data, or a last played timing of the main media data for a media component.

24. The device of claim 20, wherein the advertisement information comprises one or more of content properties for the main media data, playback status for the main media data, decoding or rendering capabilities of the device, user information for a user of the device, or advertisement insertion time slot information.

25. The device of claim 20, wherein the processing system is configured to send at least a portion of the advertisement information in one or more query parameters.

26. The device of claim 20, wherein the processing system is configured to send at least a portion of the advertisement information in one or more HTTP headers.

27. A non-transitory computer-readable storage medium having stored thereon instructions that, when executed, cause a processor of a client device to:

retrieve main media data from a main media server device according to an initial manifest file for the main media data in real time as part of a live stream, the main media data comprising media data of a representation that is assigned a non-zero value for a presentation time offset in the initial manifest file, the main media server device being separate from an advertisement server device, wherein the instructions that cause the processor to retrieve the main media data comprise instructions that cause the processor to receive the main media data via a first stream from the main media server device, the first stream comprising the live stream;

receive data indicating that the initial manifest file has expired for the live stream;

send a request for an updated manifest file for the main media data;

receive the updated manifest file for the main media data, the updated manifest file including data for continuing to retrieve the main media data in real time as part of the live stream, and the updated manifest file further including data for retrieving one or more remote periods including advertisement content;

determine an advertisement insertion time slot of the main media data from the updated manifest file for the main media data, the advertisement insertion time slot representing a defined gap in the main media data at a presentation time;

send advertisement information to the advertisement server device, the advertisement information representing characteristics of the advertisement content to be received to fill the defined gap in the main media data, the characteristics including data representing the advertisement insertion time slot and matching qualities of the main media data, wherein the instructions that cause the processor to send the advertisement information to the advertisement server device comprise instructions that cause the processor to construct one or more network packets including an Internet protocol (IP) address of the advertisement server device, the one or more network packets including the advertisement information, and to send the one or more network packets to the advertisement server device;

in response to sending the advertisement information, receive the advertisement content from the advertisement server device conforming to the characteristics, the advertisement content being formatted to fill the defined gap at the presentation time and to prevent overlap between the advertisement content and the main media data, wherein the instructions that cause the processor to receive the advertisement content comprise instructions that cause the processor to receive the advertisement content via a second stream from the advertisement server device, the second stream being separate from the first stream, such that the advertisement content as received by the client device is separate from the main media data;

provision the advertisement content to the main media data, wherein the instructions that cause the processor to provision the advertisement content to the main media data comprise instructions that cause the processor to insert the advertisement content into the main media data at the advertisement insertion time slot of the main media data to fill the defined gap at the presentation time and to prevent overlap between the advertisement content and the main media data; and send the main media data including the advertisement content at the advertisement insertion time slot to a video decoder of the client device.

28. A device for receiving media data, the device comprising:

means for receiving main media data from a main media server device according to an initial manifest file for the main media data in real time as part of a live stream, the main media data comprising media data of a representation that is assigned a non-zero value for a presentation time offset in the initial manifest file, the main media server device being separate from an advertisement server device, wherein the means for receiving the main media data comprises means for receiving the main media data via a first stream from the main media server device, the first stream comprising the live stream;

means for receiving data indicating that the initial manifest file has expired for the live stream;

means for sending a request for an updated manifest file for the main media data;

means for receiving the updated manifest file for the main media data, the updated manifest file including data for continuing to retrieve the main media data in real time as part of the live stream, and the updated manifest file further including data for retrieving one or more remote periods including advertisement content;

means for determining an advertisement insertion time slot of the main media data from the updated manifest file for the main media data, the advertisement insertion time slot representing a defined gap in the main media data at a presentation time;

means for sending advertisement information to the advertisement server device, the advertisement information representing characteristics of the advertisement content to be received to fill the defined gap in the main media data, the characteristics including data representing the advertisement insertion time slot and matching qualities of the main media data, wherein the means for sending the advertisement information to the advertisement server device comprises means for constructing one or more network packets including an Internet protocol (IP) address of the advertisement server device, the one or more network packets including the advertisement information, and means for sending the one or more network packets to the advertisement server device;

means for receiving, in response to sending the advertisement information, the advertisement content from the advertisement server device conforming to the characteristics, the advertisement content being formatted to fill the defined gap at the presentation time and to prevent overlap between the advertisement content and the main media data, wherein the means for receiving the advertisement content comprises means for receiving the advertisement content via a second stream from the advertisement server device, the second stream being separate from the first stream, such that the advertisement content as received by the device is separate from the main media data;

means for provisioning the advertisement content to the main media data, wherein the means for provisioning the advertisement content to the main media data comprises means for inserting the advertisement content into the main media data at the advertisement insertion time slot of the main media data to fill the defined gap at the presentation time and to prevent overlap between the advertisement content and the main media data; and means for sending the main media data including the advertisement content at the advertisement insertion time slot to a video decoder of the device.

* * * * *